Nov. 8, 1927.
J. V. GIESLER
1,648,047
COMBINED FLOAT AND THERMOSTAT
Filed Sept. 13, 1921
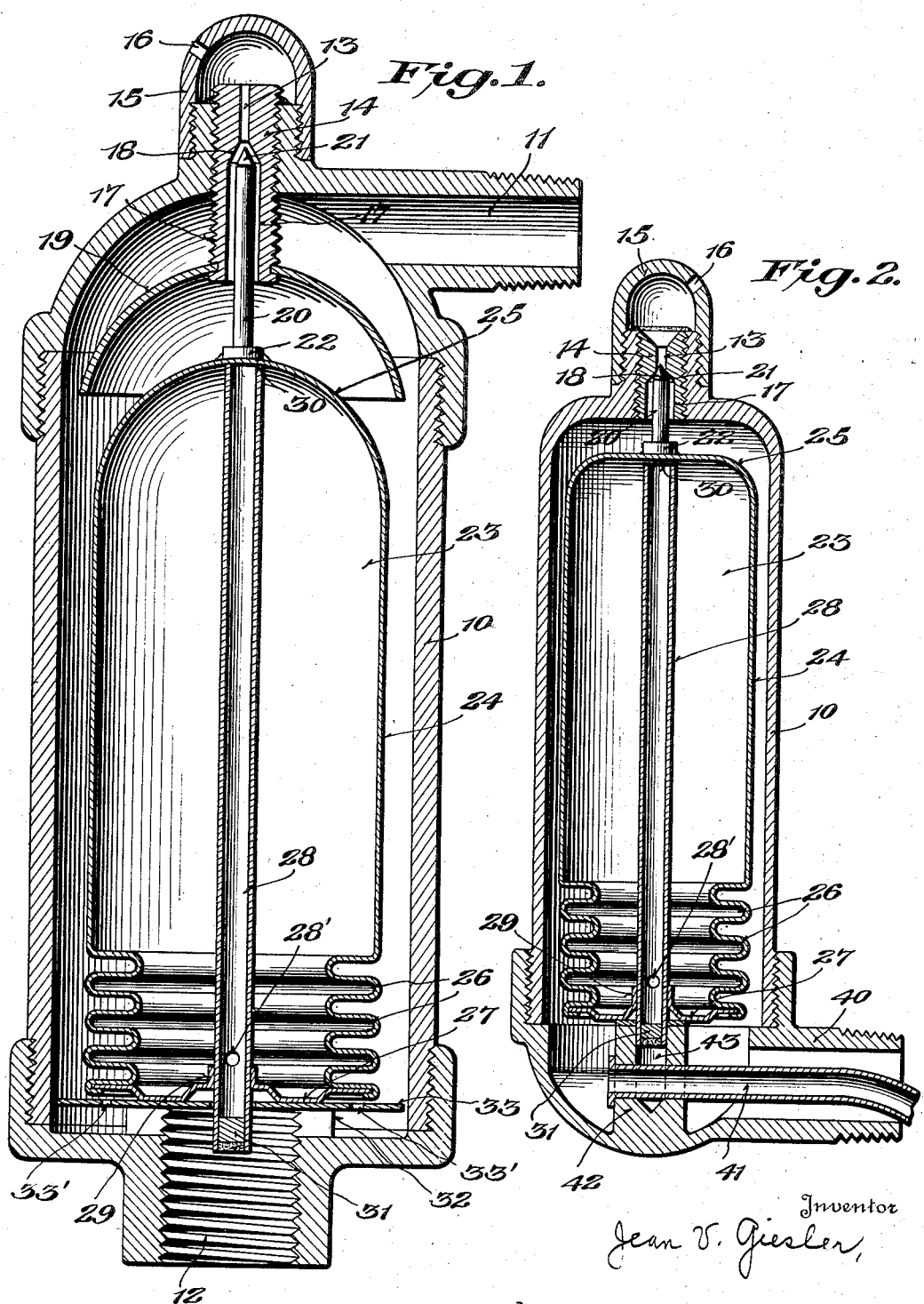
Inventor
Jean V. Giesler,
By Mauro, Cameron, Lewis & Parkam
Attorneys Patented Nov. 8, 1927.

1,648,047

UNITED STATES PATENT OFFICE.

JEAN V. GIESLER, OF KNOXVILLE, TENNESSEE, ASSIGNOR, BY MESNE ASSIGNMENTS, TO THE FULTON SYLPHON COMPANY, OF KNOXVILLE, TENNESSEE, A CORPORATION OF DELAWARE.

COMBINED FLOAT AND THERMOSTAT.

Application filed September 13, 1921. Serial No. 500,336.

This invention relates to combined floats and thermostats and, while, applicable to a variety of devices, has special reference to combined floats and thermostats for controlling an air valve, such as is commonly applied to a steam radiator to permit the escape of air but prevent the escape of steam or water.

Heretofore air valves of this character have been commonly provided with separate float and thermostatic elements which, in some cases, have been connected to form a unit. Devices of this character, however, have the serious objection that they are more or less complicated in construction and expensive to manufacture and the use of separate float and thermostatic elements frequently entails the consumption of so much space as to render use of the device impractical.

To overcome the disadvantages incident to the provision of separate float and thermostatic elements, it has been suggested to provide a combined float and thermostat by constructing a buoyant element of material which will expand and contract in response to temperature variations to actuate the valve member. Devices of this character, however, have not proved satisfactory for a number of reasons, among the more important of which is the relatively great sluggishness or thermostatic lag incident to the operation of an element which depends upon volumetric or linear expansion to effect the opening and closing of a valve.

It has also been proposed to provide a combined float and thermostat in the form of a hollow buoyant body having a diaphragm soldered or brazed into one end thereof and charged with a volatile fluid which, by change of vapor tension when subjected to the temperature of steam, will flex said diaphragm and actuate the valve member. Devices of this character have also proved unsatisfactory for a number of reasons, among the more important of which is the fact that the flexure of said diaphragm necessarily produces repeated and oppositely-directed stresses at the soldered or brazed joint, so that said joint opens after a short period of use with the consequent leakage of the volatile fluid and inoperativeness of the device.

It is an object of this invention to provide a combined float and thermostat, particularly designed for controlling an air valve, which employs an expansible and contractible hollow buoyant member having a flexible wall while avoiding the danger of rupture and leakage incident to flexure at a soldered or brazed joint.

Another object of this invention is to provide a device of the type characterized which is possessed of relatively great buoyancy for the space which it occupies. Another object of this invention is to provide a device of the type characterized wherein the hollow buoyant member has a flexible wall which is highly sensitive to the actuating force of the thermosensitive medium contained within said member.

Another object of this invention is to provide a device of the type characterized which employs a minimum number of soldered or brazed joints; also one that is composed of a minimum number of simple parts that are easy to manufacture and assemble; also one that is compact in structure and highly efficient in operation.

Stated broadly, the invention comprises a combined thermostat and float, particularly for use in an air valve, composed of a closed hollow buoyant member having a flexible lateral wall and charged with a thermosensitive medium, preferably a volatile fluid. The flexibility of said lateral wall is preferably afforded by providing said wall with a plurality of flexible corrugations which extend for only a portion of the length of said lateral wall, and the uncorrugated portion of said wall is preferably enlarged so that its cross-section is at least equal to the approximate maximum cross-section of said corrugated portion.

The invention is capable of receiving a variety of mechanical expressions, some of which are shown on the accompanying drawings, but it is to be expressly understood that the drawings are for purposes of illustration only and are not to be construed as a definition of the limits of the invention, reference being had to the appended claims for that purpose.

Referring in detail to said drawings:—

Fig. 1 is an axial section of an air valve suitable for application to a steam radiator and embodying the present invention; and Fig. 2 is an axial section on a somewhat reduced scale of another air valve also embodying the present invention and illustrating the combined float and thermostat in expanded condition.

In the form shown in Fig. 1, the valve casing 10, of any suitable form and construction, is provided with inlet and outlet connections, 11 and 12 respectively, threaded for attachment to a radiator or other suitable device. Said casing adjacent the top thereof is provided with an air vent 13, shown as an axial aperture formed in a threaded plug 14 which is received, and preferably soldered, within a threaded aperture in the top of said casing. A cap 15 of any suitable construction, through the wall of which extends one or more apertures 16, may be mounted on the casing 10 over the vent 13, if desired, for purposes of appearance and protection. The axial aperture constituting the vent 13 is shown as enlarged at its lower end 17 and provided with a conical seat 18 intermediate its sections of different diameter, whereby there is provided a valve seat for the valve member to be described. The threaded plug 14 may also carry, if desired, a baffle or deflector plate 19 adjacent its lower end.

The valve member 20, in the form shown, is composed of an elongated stem or rod having a conical end 21 for coaction with the conical seat 18, and provided adjacent its lower end with a flange or collar 22 by which said valve member may be secured in any suitable way, as by soldering or brazing, to the top of the combined float and thermostat 23.

Said combined float and thermostat, in the form shown in Fig. 1, comprises a tubular wall 24, of any suitable material but preferably of a resilient metal, closed at its upper end by a convex wall 25 integral therewith, and formed at its opposite end into a plurality of flexible corrugations 26. At its lower end, a rigid end wall 27, of any suitable form and construction, is suitably connected to the end corrugation, as by soldering or brazing. In the preferred embodiment of this invention, the uncorrugated portion of the lateral wall is relatively long as compared to the corrugated portion and at least as large in cross section as the maximum cross section through the corrugated portion, so that the corrugated portion of said lateral wall is approximately contained within the cylindrical surface defined by the uncorrugated portion of said wall; if desired, however, said uncorrugated portion may be made of even greater cross section than the maximum cross section through the corrugated portion.

The hollow closed member thus provided is preferably supplied with means to limit the extent to which said member may be contracted and, as said member is also preferably provided with a tube for introducing a thermosensitive medium into the interior thereof, said filling tube is preferably elongated to provide the stop for the contraction of said hollow member. In the form shown, a filling tube 28 is brazed or otherwise suitably secured in an aperture 29 provided in the end wall 27 and extends to a free end 30 in position to engage the end wall 25 of the hollow member and limit the contraction of said member. Said tube is also preferably provided with a vent opening 28' to permit the escape of air when the hollow member is being charged with thermosensitive medium.

Said closed hollow member is charged with a thermosensitive medium, preferably a small quantity of a volatile liquid having a boiling point at or adjacent to the temperature of steam, said thermosensitive medium being introduced through the filling tube 28 after which said tube is sealed by a plug 31 of any suitable material preferably soldered in the outer end of said tube.

The lower wall of the casing 10 is shown as provided with an upstanding and transversely slotted rib or projection 32 upon which the combined thermostat and float is normally seated and, if desired, a centering plate or spider 33, shaped to conform generally with the interior cross-section of the casing 10 and preferably provided with apertures 33', may be soldered or otherwise suitably attached to the end wall 27 of the combined float and thermostat to constitute a centering device for the lower end thereof.

In practice, the inlet 11 of the casing 10 is suitably connected to the upper portion of a radiator and the outlet 12 is suitably connected to a lower portion of said radiator. When steam is first turned into the radiator, the air is displaced thereby and may flow into the casing 10 and escape through the vent 13, the valve member 20 being spaced from the port 18 because the combined thermostat and float 23 is then in contracted position and seated on the projection 32. As soon as the air is driven out of the radiator, the steam flows into the casing 10 through the inlet 11 and is deflected downwardly into the lower portion thereof by the baffle or deflector plate 19. The temperature of this steam promptly increases the vapor tension of the volatile fluid confined within the hollow closed member 23, and said member expands owing to the flexibility of its lateral wall afforded by the corrugations 26 and engages the conical end 21 of the valve member 20 with the conical seat 18 in the air vent 13 to prevent the escape of steam. This action is effected promptly owing to the sensitive response of the vapor tension of a volatile liquid to temperature changes and to the relatively great flexibility afforded by the relatively deep corrugations 26. Valve member 20 will then be held in engagement with the seat 18 and prevent the escape of steam as long as steam enters the valve casing 10. If, on the other hand, water enters said valve casing 10, as occurs for example when a radiator becomes "waterlogged", the escape of water through the vent 13 is prevented because the hollow buoyant member 23 rises with the water until the conical end 21 of the valve member engages the seat 18, and will remain in this position as long as the water remains in the casing 10. This action is insured by the relatively large buoyancy afforded by a closed hollow member of the form and capacity provided by the present invention. In this elevated position of the combined float and thermostat, the aperture through the outlet 12 is wide open so as to permit the water to drain back into the system at the first opportunity. When the temperature in the interior of the casing 10 is reduced below that of the steam, the vapor tension of the volatile fluid in the combined float and thermostat 23 is correspondingly reduced, and said member 23 may contract, owing to the resiliency inherent in the flexible corrugations when the wall is made of resilient material, until the end wall 25 engages the stop afforded by the free end 30 of the tube 28. The conical end 21 of the valve member is thereby withdrawn from the valve seat 18 if the casing 10 is also substantially free of water, so as to permit the passage of air through the vent 13.

In the form shown in Figure 2, the valve casing 10 is provided with an inlet connection 40 at its lower end and the outlet connection is afforded by a long curved tube 41 which is smaller than the inlet 40 so as to provide a free passage for the air, steam and water through the annular space surrounding said tube 41. Said tube may be mounted in any suitable way, as by securing the same in a boss 42 extending upwardly within the lower end of the casing, and projects downwardly into the radiator or connections for a suitable distance to insure that the water will drain from the casing. In this form of the invention, said boss 42 is shown as provided with a recess 43 which coacts with the outwardly projecting end of the filling tube 28 to center the combined float and thermostat within the casing 10, said boss also constituting a seat for said combined float and thermostat when the casing is substantially free from water. Otherwise the construction of Fig. 2 is substantially the same as that illustrated in Fig. 1, corresponding parts being indicated by the same reference characters.

It will therefore be perceived that a combined float and thermostat has been provided in which the flexibility for expansion and contraction of a hollow buoyant member is afforded in the lateral wall of said member, so that the use of a flexible diaphragm has been avoided, the necessity for flexure at a soldered or brazed joint eliminated, and the danger of premature rupture and leakage overcome. At the same time, a combined float and thermostat has been provided in which the buoyant member is possessed of relatively great flexibility so that it may be readily expanded and contracted to effect the purpose for which it is designed. Furthermore, by providing an uncorrugated portion which is at least as large in cross section as the maximum cross section through the corrugated portion, said hollow member is possessed of relatively great buoyancy because of its large interior capacity; and, inasmuch as the interior of the valve casing must be made at least as large as the outside diameter of the corrugations, said hollow member affords a maximum buoyancy for the space which it must occupy. Additionally, the loss of buoyancy incident to the increase in weight necessarily accompanying the application of solder to a plurality of joints has been avoided.

While the embodiments of the invention illustrated on the drawings have been described with considerable particularity it is to be expressly understood that the invention is not limited thereto, as the invention is capable of being embodied in a variety of ways, some of which will now readily suggest themselves to those skilled in the art, while changes may be made in the sizes, portions and details of construction without departing from the spirit of this invention. While the corrugated portion of the combined float and thermostat has been shown as positioned at the lower end thereof, such is not essential, as the device would still be possessed of marked utility if it were inverted and the valve member attached to the corrugated end, or if the corrugations were disposed intermediate the ends of the lateral wall. Reference is therefore to be had to the claims hereto appended for a definition of the limits of said invention.

What is claimed is:

1. In an air valve, the combination with a valve member for controlling a vent, of a combined float and thermostat operatively connected to said valve member and comprising a closed hollow buoyant member containing a volatile fluid and having a lateral wall which is provided with flexible corrugations for a portion only of its length, said corrugations rendering said lateral wall extensible under an increase of vapor tension in said member.

2. In an air valve, the combination with a valve member for controlling a vent, of a combined float and thermostat operatively connected to said valve member and comprising a closed hollow buoyant member containing a volatile fluid and having a lateral wall which is uncorrugated for the major portion of its length but provided with flexible corrugations for a portion of its length to render said wall extensible and contractible.

3. In an air valve, the combination with a valve member for controlling a vent, of a combined float and thermostat operatively connected to said valve member and comprising a closed buoyant member containing a volatile fluid and having its lateral wall constituted by a rigid portion and a portion integral therewith and composed of flexible corrugations which render said wall axially extensible and contractible in response to variations in the vapor tension of said fluid.

4. In an air valve, the combination with a valve member for controlling a vent, of a combined float and thermostat operatively connected to said valve member and comprising a closed buoyant member containing a volatile fluid and having its lateral wall provided with flexible corrugations for a portion only of its length, said corrugations extending inwardly with respect to the surface defined by the uncorrugated portion of said lateral wall.

5. In an air valve, the combination with a valve member for controlling a vent, of a combined float and thermostat operatively connected to said valve member and comprising a closed buoyant tubular member containing a volatile fluid and having its lateral wall provided with flexible corrugations for a part of its length and substantially cylindrical for a part of its length, said cylindrical portion having a diameter at least as large as the approximate outside diameter of said corrugations.

6. In an air valve, the combination with a valve member for controlling a vent, of a combined float and thermostat operatively connected to said valve member and comprising a closed buoyant member containing a thermosensitive medium and having an integral lateral wall flexibly corrugated for a portion of its length only.

7. A combined thermostat and float comprising a closed buoyant member having a tubular wall provided for a portion only of its length with flexible corrugations the outside diameter of which is approximately equal to the diameter of the uncorrugated portion of said wall, and a thermosensitive medium in said member.

8. A combined thermostat and float comprising a closed buoyant member having a lateral wall and an integral end wall, a portion of said lateral wall being provided with flexible corrugations and having a rigid end wall secured to the corrugated end thereof, and means extending through said rigid end wall and adapted for engagement with the integral end wall for limiting the contraction of said member and for introducing a thermosensitive medium into the member.

9. A buoyant member comprising a closed hollow body having a lateral wall flexibly corrugated for a portion only of its length, the inwardly directed folds of said corrugations being substantially wholly within the surface defined by the uncorrugated portion of said wall.

10. A buoyant member comprising a closed hollow body having its lateral wall composed of a plurality of integral flexible corrugations and an uncorrugated portion integral with said corrugations and of a diameter at least as great as the approximate outside diameter of said corrugations.

11. A buoyant member comprising a closed hollow body having a tubular wall closed at one end by a wall integral therewith, said tubular wall being provided with flexible corrugations for a portion only of its length and closed at its other end by a wall attached to said tubular wall.

12. A combined thermostat and float comprising a closed buoyant member having its lateral wall provided with flexible corrugations for a portion only of its length and containing a volatile fluid for elongating said member.

In testimony whereof I have signed this specification.

JEAN V. GIESLER.